(12) United States Patent
Koura (10) Patent No.: US 6,490,016 B1
(45) Date of Patent: Dec. 3, 2002

(54) FLAT-PANEL DISPLAY DEVICE HAVING A BACKLIGHT AND AN ELECTROMAGNETIC SHIELD CASING

(76) Inventor: Shinzi Koura, Tokyo (JP)

( * ) Notice: Subject to any disclaimer, the term of this patent is extended or adjusted under 35 U.S.C. 154(b) by 99 days.

(21) Appl. No.: 09/608,441

(22) Filed: Jun. 30, 2000

(30) Foreign Application Priority Data

Jun. 30, 1999 (JP) .......................................... 11-184957

(51) Int. Cl.[7] ........................................... G02F 1/1333
(52) U.S. Cl. .............................. 349/58; 349/59; 349/65
(58) Field of Search ............................... 349/58, 59, 65

(56) References Cited

U.S. PATENT DOCUMENTS 6,008,870 A * 12/1999 Yun ............................ 349/58

* cited by examiner

Primary Examiner—William L. Sikes
Assistant Examiner—Thoi Van Duong (57) ABSTRACT

Through a cross-sectionally L-shaped leaf-spring metal fitting, a shield sheet and a shield casing or a bezel cover is electrically connected, to ground the shield sheet. The leaf-spring metal fitting has a horizontal section and a vertical section, and has first and second "tongue-shaped" leaf springs respectively on the horizontal and vertical sections. The horizontal section of the leaf-spring metal fitting is inserted between a resin frame of the backlight unit and the shield sheet disposed on lower face of a light-guide plate. Meanwhile, the vertical section of the leaf-spring metal fitting is sandwiched between a resin frame of the backlight unit and the shield casing.

14 Claims, 6 Drawing Sheets

FLAT-PANEL DISPLAY DEVICE HAVING A BACKLIGHT AND AN ELECTROMAGNETIC SHIELD CASING

BACKGROUND OF THE INVENTION

This invention relates to a flat-panel display device having a backlight and, more particularly, to a liquid-crystal display device having an electromagnetic shielding sheet or plate disposed around a lamp of the backlight.

Recently, flat-panel display devices such as liquid-crystal display devices have been used as image display devices for wide range of computers and mobile information appliances, car navigation system and the like because of their features that they are thin and light-weighted and consume a small electric power. Particularly, the flat-panel display devices has come to be widely used for television sets—ranging from small mobile one to on-wall placing large one, for a car navigation system and the like, and for various computers, car navigation systems and the like.

Heretofore, a light-transmissive liquid-crystal display device for displaying a high-definition image is exemplified.

The liquid-crystal display device is comprised of, at least, a liquid-crystal panel formed of a pair of transparent substrate plate with a liquid crystal sandwiched therebetween; a surface illuminant device, referred as a backlight, disposed along rear face of the liquid-crystal panel and supplying a light from light source to the rear face; and a shield casing in a picture-frame shape, referred as a bezel cover, which covers all periphery and its vicinity, of the liquid-crystal display device in a manner for reducing an electromagnetic noise and a manner for enhancing mechanical strength of the liquid-crystal display device.

Figure 4:
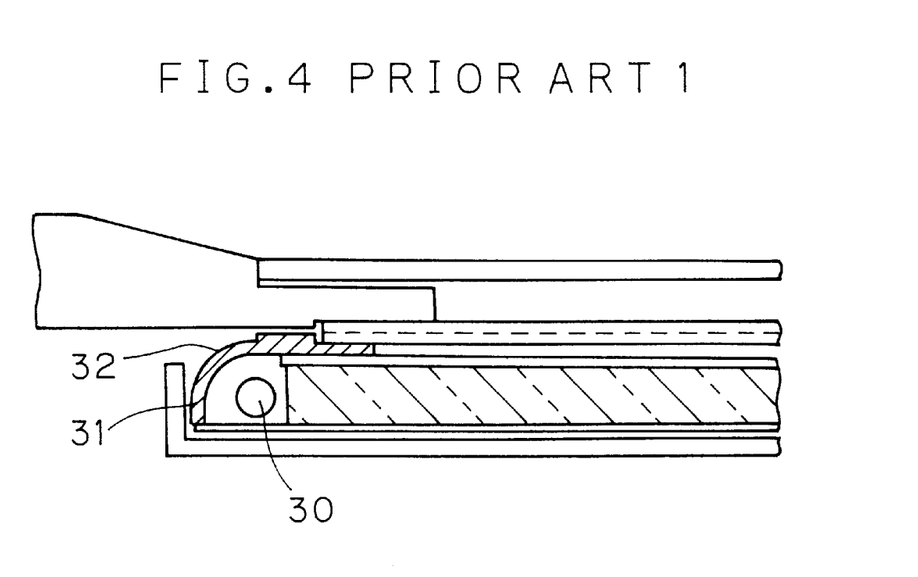
FIG. 4 is a vertical sectional view showing an essential part of a flat-panel display device of Prior art 1.

In the above, a lamp in the surface illuminant device is usually a luminescence lamp driven by a high-frequency electricity and thus becomes an electromagnetic noise source. When the liquid-crystal display undergoes an effect of the electromagnetic noise, a stripe pattern may appear on the displaying screen to impair discernability or display quality on the displaying screen. In view of this, JP-A-05324175 (JP-A-1993-324175, Japanese unexamined patent publication No.5-324175(1993)) discloses a construction of the liquid-crystal display in which the electromagnetic noise emitted from the surface illuminant device is prevented from affecting the liquid-crystal panel. The disclosed construction is hereunder explained by referring to a cross sectional view of the liquid-crystal panel shown in FIG. 4. A surface of a lamp holder 31 for a luminescence lamp disposed along a periphery of the liquid-crystal panel is electroplated with nickel or copper to effect grounding of the lamp holder 31. A general construction for the grounding is such that a shielding sheet or a lamp cover formed of electro-conductive material is disposed in a vicinity of the luminescence lamp in the surface illuminant device and is connected with the shield casing to effect the grounding.

Figure 5:
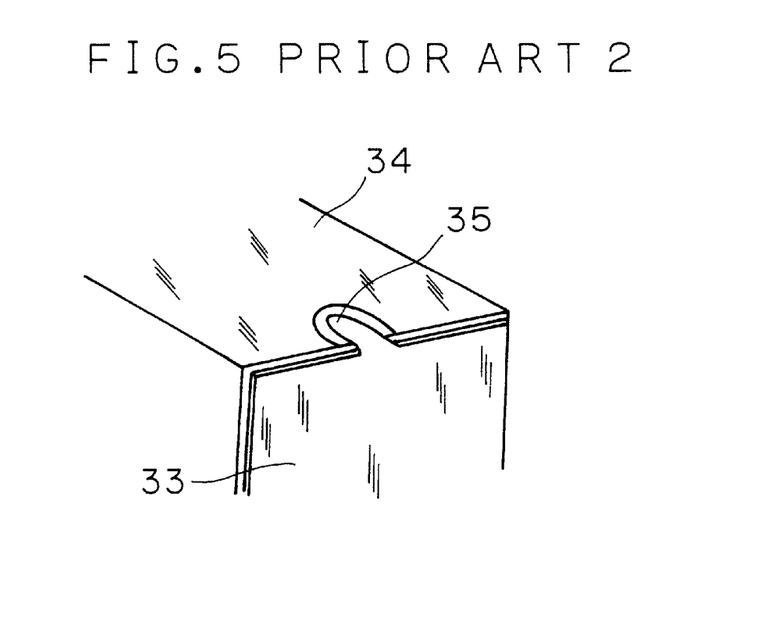
FIG. 5 is a vertical sectional view showing an essential part of a flat-panel display device of Prior art 2.

A detailed construction for the grounding in prior art is disclosed in JP-A-10096947 (JP-A-1998-096947, Japanese unexamined patent publication No.10 96947(1998)), and is shown in FIG. 5. As shown in FIG. 5, a lip 35 extended from the shield casing 33 is electrically connected with a lamp cover 34 by soldering. Although such construction enables strong and rigid adhering, very strong mechanical shock may peel off the solder. Moreover, such construction requires cost increase because the lip 35 and the shield casing 33 have to be formed of copper, which is relatively expensive and is needed for enabling the soldering.

Figure 6:
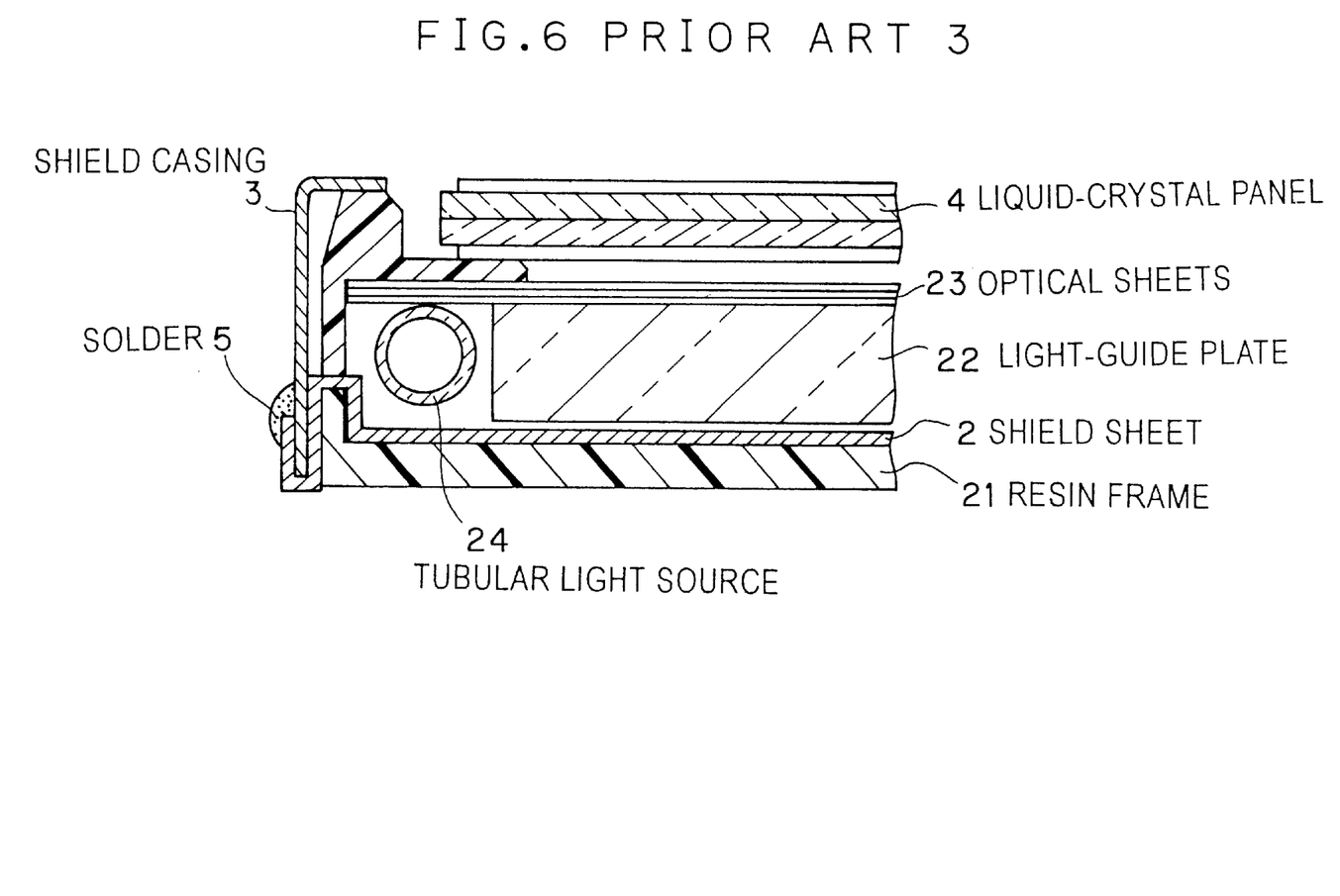
FIG. 6 is a vertical sectional view showing an essential part of a flat-panel display device of Prior art 3.

Whereas, in hereabove, electromagnetic shielding constructions using a lamp cover are explained, FIG. 6 shows a typical construction using a shielding sheet such as an aluminum foil, where the shielding sheet is connected with the shield casing by soldering. A surface illuminant device shown in the FIG. 6 is of sidelight type or edge-light type. The surface illuminant device comprises; a resin frame 21 on which a liquid-crystal panel 4 is placed; a light-guide plate 22 accommodated inside of the resin frame 21; optical films 23 placed on the light-guide plate 22; and a tubular light source 24 disposed along an edge of the light-guide plate 22. A shield sheet 2 is disposed inside of the resin frame 21 so as to cover at least back surface of the light-guide plate 22 and backside of the tubular light source 24.

A portion of the shield sheet 2 is pulled out from the inside of the resin frame 21 and is connected with a shield casing 3 by soldering to effect grounding of the shield sheet 2 at the time the shield casing 3 is assembled with the resin frame 21. Due to use of soldering in this prior art, above-mentioned problem should also be arisen.

Figure 7:
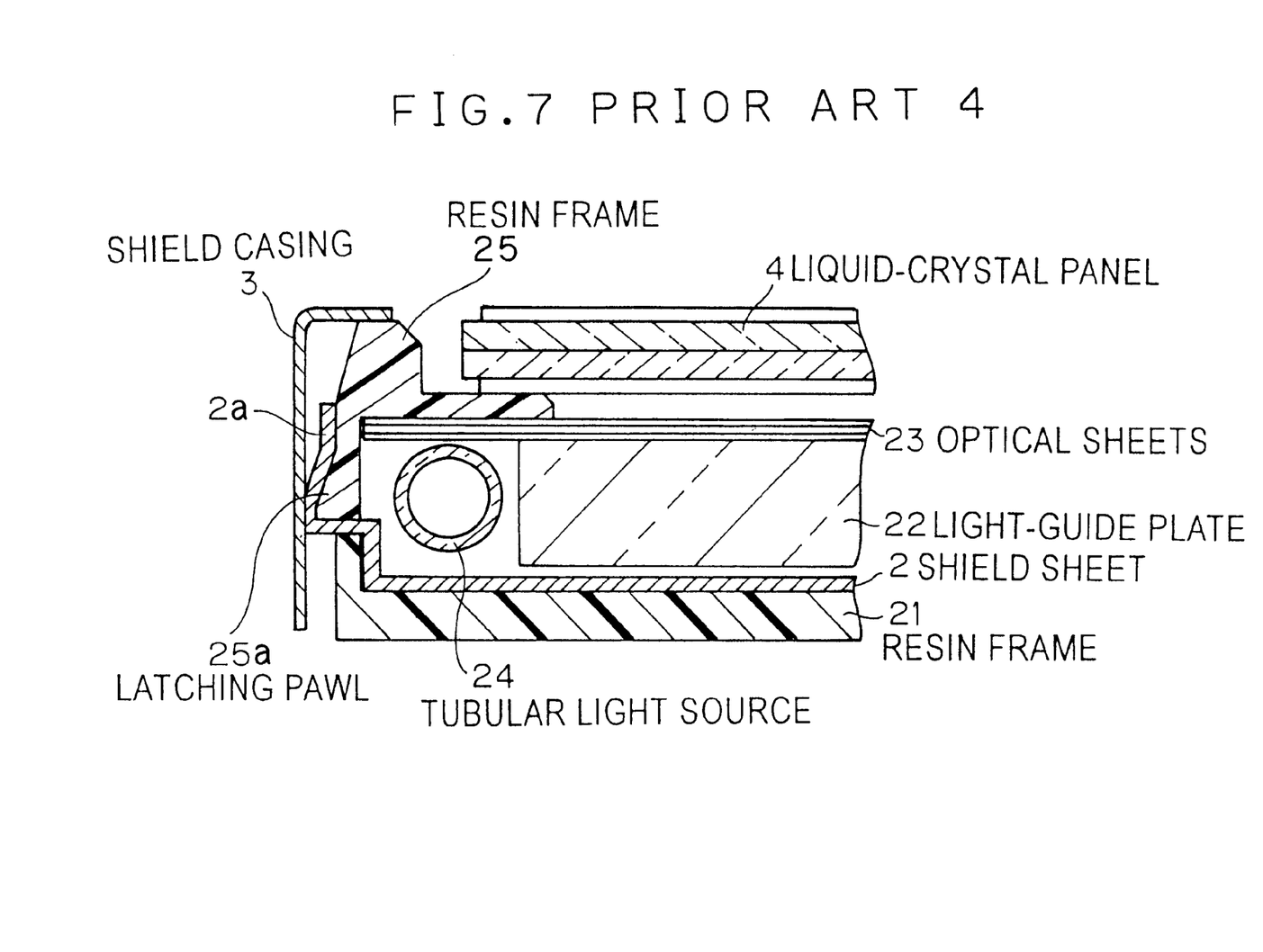
FIG. 7 is a vertical sectional view showing an essential part of a flat-panel display device of Prior art 4.

Another construction in the prior art is shown in FIG. 7. For basic construction is same with that shown in the FIG. 6, explanation of them will be omitted. In a construction shown in the FIG. 7, a first resin frame 21 and a second resin frame 25 are assembled to be fastened together by a latching pawl 25a projected from the second resin frame 25. A portion of the shield sheet 2 is pulled out from inside of the resin frames 21,25 to form a pulled-out portion 2a on inner surface of the shield casing 3 and to cover the latching pawl 2a. In this way, grounding of the shield sheet 2 is achieved by directly contacting the shield sheet 2 with the shield casing 3. However, this construction has a following drawback—electric connection of the shield sheet 2 with the shield casing 3 should be momentarily disconnected to momentarily disrupt grounding when the shield casing 3 undergoes a momentary deformation incurred by a mechanical shock or the like. Thus, a noise pattern may appear momentarily on the display screen.

As explained above, prior art techniques for grounding the shield sheet by connecting with the shield casing give rise drawbacks: Use of soldering for connecting requires use of expensive material such as copper and may incur disconnecting of the connection. Meanwhile, a shield casing is constructed to sandwichedly press the portion of the shield sheet on the resin frame for effecting the connection for the grounding; thus, the connection for the grounding is unreliable under a mechanical shock.

In view of the above drawbacks, the present invention is aimed to provide a flat-panel display which has enhanced reliability in the connection for grounding the shielding flat conductor such as a shield sheet even under a condition mechanical shocks are incurred as in a car navigation system, and which is capable to keep assembling cost to be low enough.

BRIEF SUMMARY OF THE INVENTION

To achieve the aim, an invention-wise flat-panel display comprising: a light-guide plate; a tubular light source disposed at least along one edge of the light-guide plate; a flat conductor disposed along at least part of a main face of the light-guide plate and along at least a region that covers circumferential surface of the tubular light source except with a light-guide-plate side of the tubular light source; a frame accommodating, at least, the light-guide plate, the tubular light source and the flat conductor; a display panel being placed above another main face of the light-guide plate; an electrically-conductive casing that hold the display panel so as to be sandwiched between the frame and the electrically-conductive casing; an electrically-connecting conductor element having a first leaf spring pressed and sandwiched between the flat conductor and the frame and a second leaf spring pressed and sandwiched between the electrically-conductive casing and the frame.

In another aspect of the present invention, a flat-panel display device comprising: a frame having a base plate, sidewalls extending upward from a whole periphery of the base plate, a slit on one of the side walls disposed at a position to join the base plate and a recess on an upper face of the base plate that extends inward from the slit; a flat conductor disposed at least on part of the upper face of the base plate and to contact an inner face of said one of side walls, said flat conductor being folded to be substantially C-shaped in a vicinity of said one of side walls at a cross sectional view; a light-guide plate placed on said upper face of the base plate through the flat conductor therebetween; a tubular light source disposed between said one of sidewalls and the light-guide plate, a circumferential surface of said tubular light source being disposed in a vicinity of the flat conductor except with a light-guide-plate side of the circumferential surface; a display panel being placed above the light-guide plate; an electrically-connecting conductor element having a first leaf spring pressed and sandwiched between the flat conductor and the frame as being inserted from the slit and a second leaf spring contacting on an outer face of said one of side walls; and an electrically-conductive casing that hold the second leaf spring so as to be sandwiched between said one of sidewalls and the electrically-conductive casing.

By this feature, enhanced reliability in the connection for grounding the flat conductor is achieved while keeping the assembling cost to be low enough.

DETAILED DESCRIPTION OF THE INVENTION

An embodiment of the present invention is explained in conjunction with the drawings.

Figure 1:
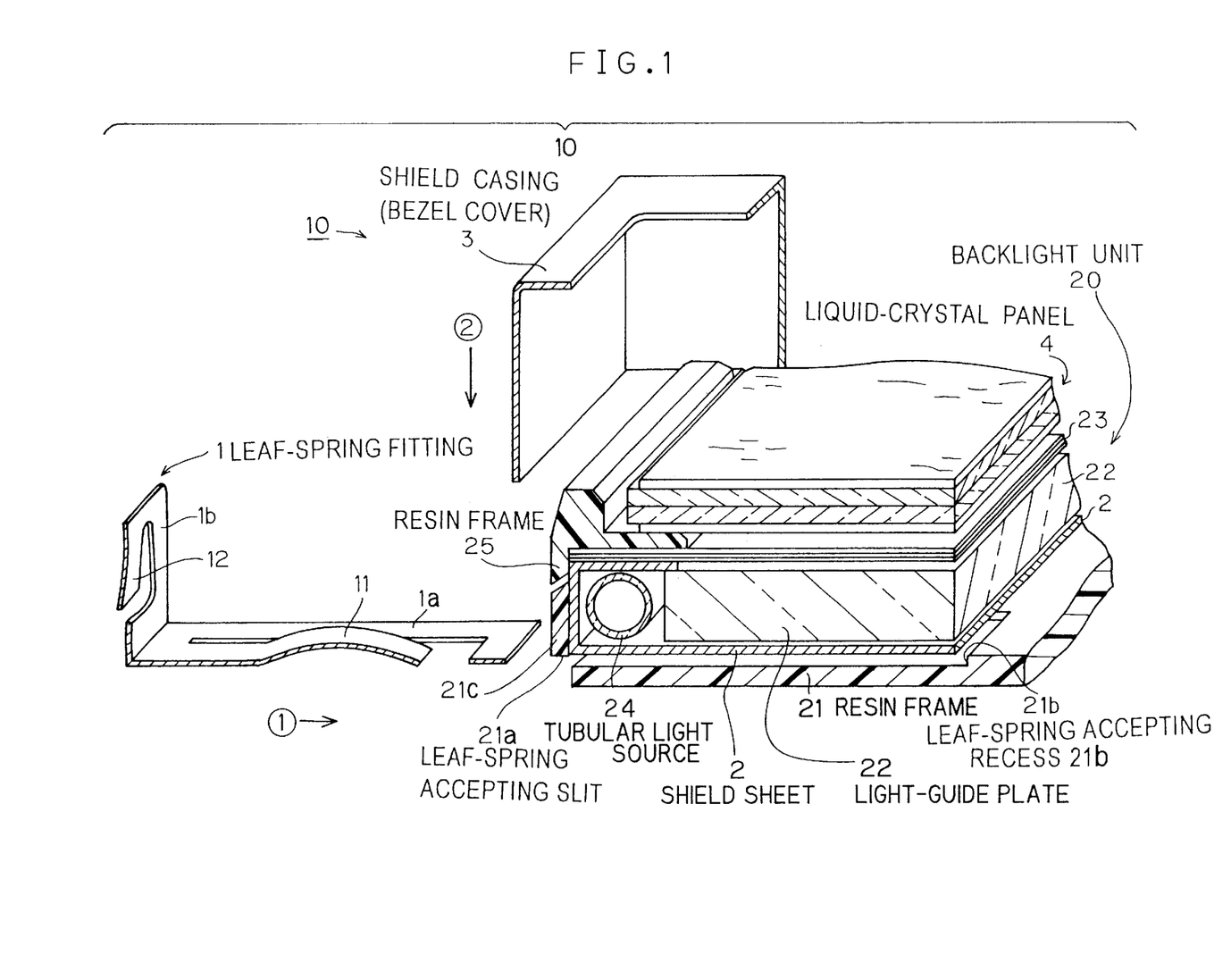
FIG. 1 is a fragmentary sectional perspective view schematically showing a flat-panel display device of the embodiment.
Figure 2:
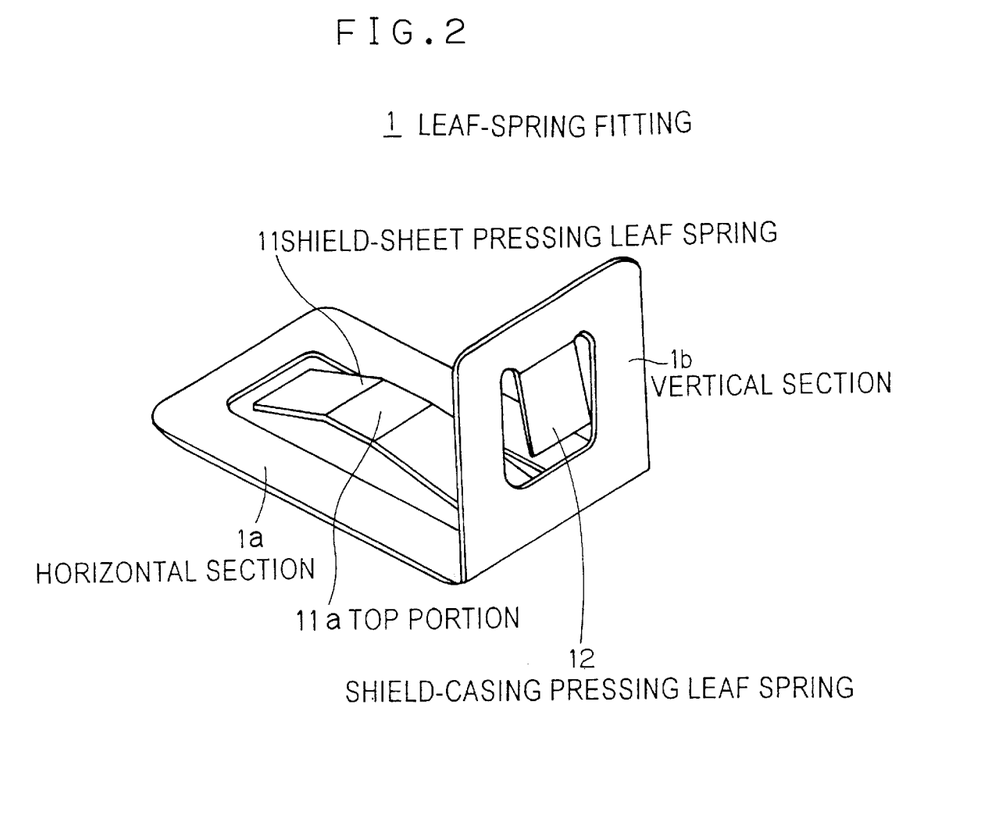
FIG. 2 is a schematic perspective view showing a leaf-spring metal fitting which is used in the flat-panel display device the embodiment.

FIG. 1 is a fragmentary sectional perspective view schematically and exemplary showing a liquid-crystal display device 10 as a flat-panel display device of the embodiment;

and FIG. 2 is a schematic perspective view showing a leaf-spring metal fitting 1 which is used in the liquid-crystal display device 10. In the embodiment, a resin frame is used as a frame for the device because of easiness of molding, while a shield casing formed of metal such as aluminum is exemplarily used as an electrically conductive casing for the device. The leaf-spring fitting 1 formed of metal such as aluminum is exemplarily used as a connector element for electrically connecting the shield casing with a flat conductor. Although the flat conductor may be a plate of aluminum metal or the like, a shield sheet is exemplarily used because of its easiness for processing and arrangement.

The liquid-crystal display device 10 comprises: a flat, rectangular back light unit 20; a resin frame 25 placed on the back light unit 20; a display panel 4 interposed on the back light unit 20 through the resin frame 25 therebetween; and a picture-frame shaped shield casing 3 that has an inversed L-shaped cross section and covers periphery portions of the display panel 4 and the back light unit 20 from display-screen side of the device 10. The back light unit 20 is comprised of: a shield sheet 2 placed on the resin frame 21 (if the shield sheet is used as a reflector for a light); a tubular light source 24; a light-guide plate 22; and a plurality of optical sheets 23 placed on the light-guide plate 22. The liquid-crystal display device 10 further comprises a leaf-spring fitting 1 having a substantially L-shaped cross section. The leaf-spring fitting 1 consists of; a horizontal section 1a extending along a display screen of the liquid-crystal display device 10; and a vertical section 1b perpendicular to the horizontal section 1a. The horizontal section 1a is inserted into a lower-most portion of the back light unit 20 while the vertical section 1b is held and sandwiched between the shield casing 3 and the backlight unit 20 and between the shield casing 3 and the resin frame 25.

In the back light unit 20, a rectangular light-guide plate is held between a tray-shaped resin frame 21 on backside and the picture-frame-shaped resin frame 25 on display-screen side. The tubular light source 24 is disposed in an elongated gap between an edge face of the light-guide plate 22 and the resin frames 21,25. A whole of the display-screen-side face of the light-guide plate is covered by the optical sheets 23.

One piece of the shield sheet 2 is disposed inside the back light unit 20 so as to cover substantially whole of the inner faces of the resin frames 21,25, leaving the display-screen side of the light-guide plate 22.

The shield sheet 2 shield or suppresses the electromagnetic noise from the tubular light source 24 and additionally may take a role as a reflector for the tubular light source 24 and a role as a reflection sheet disposed on backside face of the light-guide plate 22. In such case, the shield sheet 2 has a reflective material on its surface facing the tubular light source 24 and the light-guide plate 22, so that the shield sheet 2 covers a backside, an outer or peripheral side and display-screen side of the tubular light source 24 and backside face of the light-guide plate 22. In this manner, the shield sheet 2 acts as a reflector for directing a light from the tubular light source 24 to an edge face of the light-guide plate 22 and also acts as a reflective film for reflecting a light at backside face of the light-guide plate 22 by covering whole of the backside face. The shield sheet 2, for example, may be formed of a resin sheet and an aluminum layer as a conductive layer laminated on a surface of the resin sheet contacting the resin frames 21,25. Thus obtained laminated sheet, as a whole, acts as an electromagnetic shielding sheet equipped with a reflector function. Such integral formation of the elements enables a process reduction and a cost reduction by reducing numbers of the elements. Whereas the shield sheet 4 covers a whole of backside face of the light-guide plate 22 in the above-explanation of the embodiment, the shield sheet 4 may cover only a part of the backside face of the light-guide plate and cover a light-emitting surface of the tubular light source 24 except with its light-guide-plate side, when only to prevent effect of electromagnetic noises from the tubular light source 24. Such arrangement of the shield sheet 4 is fully effective for preventing the electromagnetic noises.

The tray-shaped resin frame 21 on backside has a leaf-spring-accepting slit 21a that is a slit on lower end of the sidewall 21c of the resin frame 21 and extends along the tubular light source 24. The base plate of the resin frame 21 has a leaf-spring-accepting recess 21b that is a shallow tray-shaped recess having a rectangular shape a short side of which is the leaf-spring-accepting slit 21a. When the back light unit 20 is assembled up, the shield sheet 2 covers the leaf-spring-accepting recess 21b to form a pocket having a slit-shaped cross section. This pocket accepts the horizontal section 1a of the leaf-spring fitting 1 as will be explained. For example, a length or horizontal dimension of the leaf-spring-accepting slit 21a is roughly same with the width of the horizontal section 1a of the leaf-spring fitting 1; and width-wise and length-wise dimensions of the horizontal section 1a are roughly same with those of the leaf-spring-accepting recess 21b. By this design, the shield sheet 4 is mostly supported in a secured manner by the base plate. Thus, when the shield sheet 4 also acts as a reflective film, uniform reflection light is secured over whole of a main surface of the light-guide plate.

The leaf spring fitting 1 is formed of stainless steel, for example, and is formed of a rather elongated rectangular plate that is folded perpendicularly to form a folding line along width-wise direction. A shield-sheet-pressing leaf spring 11 and a shield-casing-pressing leaf spring 12, which are "tongue-shaped" leaf spring, are formed by blanking of the plate respectively on the horizontal section 1a and on the vertical section 1b.

The shield-sheet-pressing leaf spring lion the horizontal section 1a extends like "a tongue" from folding-line side toward the distal end of the horizontal section 1a. The shield-sheet-pressing leaf spring 11 is bent upward so as to bulge upward in a direction the vertical section 1b extends and has a flat top portion hla at almost center of the "tongue shape". Meanwhile, the shield-casing-pressing leaf spring 12 on the vertical section 1b extends like "a tongue" toward the folding line and is bent, at a base portion of the "tongue shape", outwardly or in a direction departing from the horizontal section 1a.

After completion of the assembling of the backlight unit 20, the horizontal section 1a of the leaf-spring fitting 1 is inserted through the leaf-spring-accepting slit 21a and is accepted in the tray-shaped leaf-spring-accepting recess 21b on the resin frame 21. In this state, the shield-sheet-pressing leaf spring 11 is pressed from upward by lower face of the light-guide plate 22 so as to be flattened and extended. Thus, the shield-sheet-pressing leaf spring 11, at least the flat top portion 11a thereof, is pressed onto the shield sheet 2 disposed on lower face of the light-guide plate 22 by an elastic force of the leaf spring. In this way, the shield-sheet-pressing leaf spring 11 is firmly contacted with the shield sheet 2 to securely achieve electrical connection therebetween. If the flat top portion 11a is set to be parallel with the shield sheet 2 at a pressed state, the shield sheet 2 is not damaged by such press contact because the flat top portion lha is the press-contacting portion of the leaf spring When insertion of the horizontal section 1a of the leaf-spring fitting 1 is completed, the vertical section 1b of the leaf-spring fitting 1 comes to be placed in vicinity of the edge face of the backlight unit 20. More particularly, the vertical section 1b comes into contact with a sidewall 21c of the resin frame 21 and with the resin frame 25 on display-screen side.

After completing of the insertion and placing of the liquid-crystal panel 4 on the backlight unit 20, the shield casing 2 is put on so as to cover whole periphery and its vicinity of the liquid-crystal panel 4 and the backlight unit 20 as a whole. In this state, the shield-casing-pressing leaf spring 12, at least its distal end portion, is firmly pressed onto an inner face of the shield casing 3 to securely achieve electrical connection therebetween.

As explained heretofore, through the leaf-spring fitting 1, grounding of the shield sheet 2 onto the shield casing 2 is securely achieved.

According to the above embodiment, both of the electrical connections between the leaf-spring fitting 1 and the shield sheet 2 and between the leaf-spring fitting 1 and the shield casing 2 are effected in use of elastic force by the shield-sheet-pressing leaf spring 11 or by the shield-casing-pressing leaf spring 12. Thus, no temporary break of the contact takes place even when the flat-pane display device undergoes a mechanical shock; and accordingly no temporary disruption on screen display gives rise. Moreover, reliability of the grounding is damaged even at a sever use condition liable to undergo a mechanical shock such as used in a notebook PC or a mobile information appliance.

Meanwhile, no additional elements other than the leaf-spring fitting 1 are needed for achieving such grounding, while the leaf-spring fitting 1 is easily produced by a blanking and folding of the metal plate for example. Moreover, added process for assembling is solely inserting of the leaf-spring fitting 1. Thus, cost for the elements is reduced considerably compared with the cases the grounding is made as in the prior art.

In following, an example of dimensional construction of the invention-wise leaf-spring fitting will be explained by referring to FIG. 3. Particularly, relation between a depth d1 of the leaf-spring accepting recess 21b and a thickness-wise dimension d2 of the horizontal section 1a including the leaf spring 11 will be explained using same reference numeral as in the FIGS. 1 and 2.

The top portion lha in the leaf-spring fitting 1 is press-contacted with the shield sheet 2 by elastic force of the spring whereas the grounding for the connection is achieved trough the leaf-spring fitting 1. When the leaf-spring fitting 1 is inserted into the leaf-accepting recess 21b on the resin frame 21 and if a gap at the recess between the shield sheet 2 and the resin frame 21 is too narrow, elasticity of the leaf spring 11 pressed in the gap may decrease with elapse of time. In more detail, if the depth of leaf-spring recess is excessively smaller than thickness-wise dimension of the horizontal section 1a through the flat top portion 11a, the flat top portion 11a is excessively pressed to be flattened by strong force. Such state tends to give rise time-elapse-wise decrease of the elastic force for recovering original shape of the leaf spring 11. When such decrease is considerable, action of the leaf spring 11 is weakened to induce momentary disconnection of the contact for grounding at mechanical shock incurred on the device and to induce disruption on the display screen by the electromagnetic noise, as in the prior art.

To avoid such problem, it is desirable to impose some restriction on the upwardly pressing force at the flat top portion 11a by an adequate construction of the device 10. By such an adequate construction, tendency of the time-lapse-wise decrease of the upwardly pressing force is known to be weaker enough than in the case of construction lacking the restriction on the upwardly pressing force. By an actual test, an adequate load range of the upwardly pressing force for press-contacting the flat top portion h1a with the shield sheet 2 is determined. As a result, it is known that a load range from about 250 g to about 300 g is preferable. FIG. 3 shows a dimension-wise example of the liquid-crystal display device that satisfies the above load range. FIG. 3 specifically show the depth d1 or thickness-wise dimension of the leaf-spring accepting recess 21b as well as the thickness-wise dimension d2 of the horizontal section 1a, that is, the dimension d2 between a lower face of the horizontal section 1a and an upper face of the flat top portion 11a.

In the Figure, the former dimension d1 is 0.45 mm while the latter dimension d2 is 0.7 mm. A preferable range of difference between the former dimension d1 and the latter dimension d2 is roughly from 0.2 mm to 0.3 mm. Dimensional error in the range of 0.1 mm to 0.2 mm, for the former and latter dimension d1 and d2, presumably causes no problem.

Figure 3:
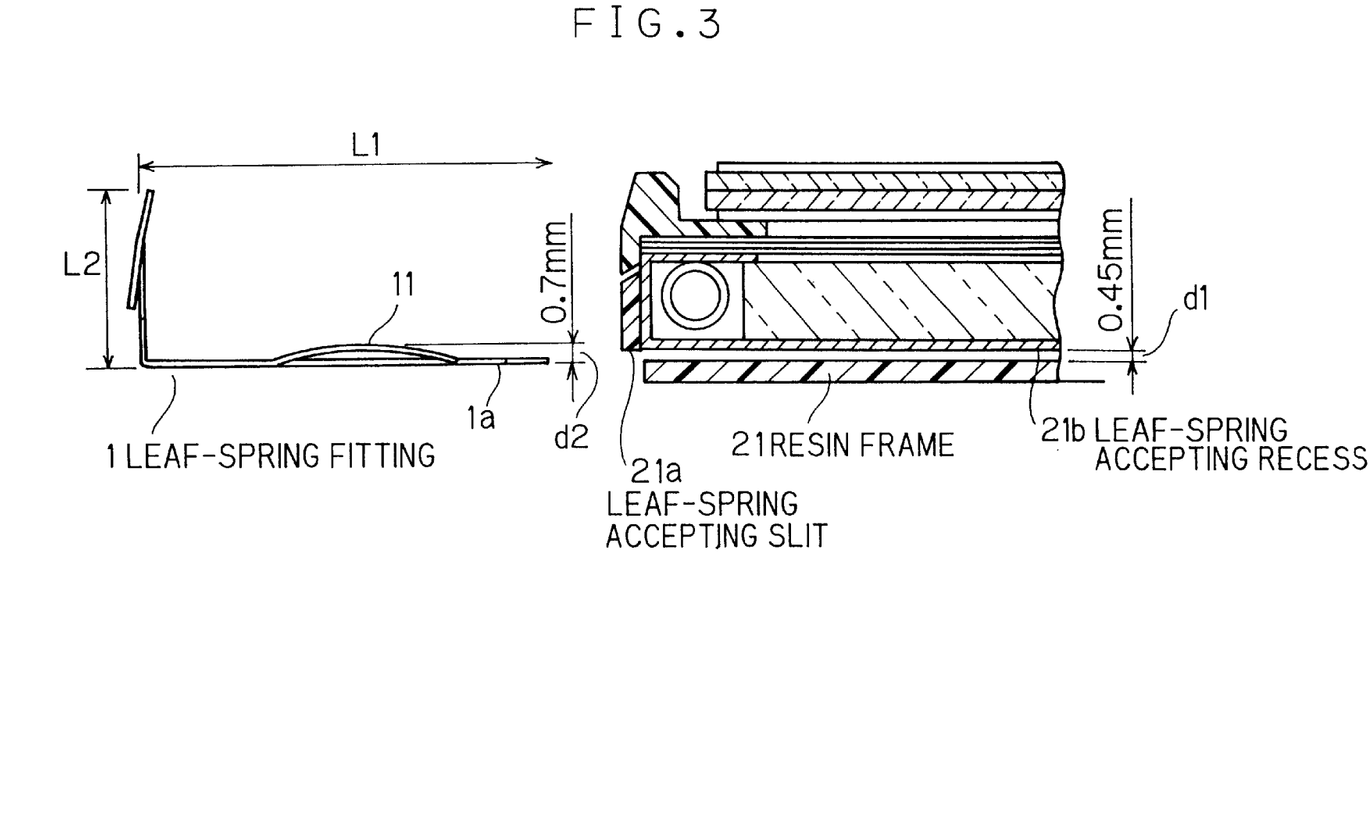
FIG. 3 is a fragmentary sectional perspective view corresponding the FIG. 1, showing a relation between a thickness-wise dimension of the horizontal section of the leaf-spring metal fitting having a leaf spring and a thickness-wise dimension of a metal-fitting-accepting recess for accepting the horizontal section of the leaf-spring metal fitting.

In this explanation, the length L1 of the horizontal section 1a is about 15 mm; the length L2 of the vertical section 1b about 15 mm; and FIG. 3 is almost exact illustration of the dimensional construction of the leaf-spring fitting 1.

By the dimensional construction as in above, the time-elapse-wise decrease of the elastic force is suppressed, so as to achieve more stable connection for the grounding without causing interruption of the connection at the time of mechanical shock being incurred on the device.

On the other hand, in an example shown in FIG. 3, distal end portion of the vertical section 1b is inclined inward. This inclination is coincided with the inward inclination of the upper portion of the resin frame 25 and corresponding portion of the shield casing 3 which portions sandwich the distal end portion of the vertical section 1b. In this way, in a cross sectional view, outline of the vertical section 1b runs along the outer face of the resin frame 25 and corresponding portion of the shield casing 3.

What is claimed is:

1. A flat-panel display device comprising:
    a light-guide plate;
    a tubular light source disposed at least along one edge of the light-guide plate;
    a flexible conductor sheet disposed along at least a major part of a main face of the light-guide plate and along at least a region that covers circumferential surface of the tubular light source except with a light-guide-plate side of the tubular light source;
    a resin frame accommodating, at least, the light-guide plate, the tubular light source and the conductor sheet;
    a display panel positioned above another main face of the light-guide plate;
    an electrically-conductive casing that holds the display panel so as to be sandwiched between the frame and the electrically-conductive casing; and
    an electrically-connecting conductor element having
        a first leaf spring pressed and sandwiched between said main face of the light-guide plate and the resin frame, so as to be in surface-to-surface contact with the conductor sheet on said main face, and
        a second leaf spring pressed and sandwiched between the electrically-conductive casing and the resin frame.

2. A flat-panel display device according to claim 1, wherein said electrically-connecting conductor element is formed by blanking and folding of a metal plate and is substantially L-shaped in a cross section.

3. A flat-panel display device according to claim 1, wherein said conductor sheet is a laminated sheet formed of a conductor layer, in contact with said first leaf spring, and an insulator sheet.

4. A flat-panel display device comprising:
    a frame having
        a base plate,
        sidewalls extending upward from a whole periphery of the base plate,
        a slit on one of the side walls disposed at a position to join the base plate and
        a recess on an upper face of the base plate that extends inward from the slit;
    a flexible conductor sheet disposed at least on part of the upper face of the base plate and to contact an inner face of said one of side walls, said conductor sheet being folded to be substantially C-shaped in a vicinity of said one of side walls at a cross sectional view;
    a light-guide plate placed on said upper face of the base plate through the conductor sheet therebetween;
    a tubular light source disposed between said one of sidewalls and the light-guide plate, a circumferential surface of said tubular light source being disposed in a vicinity of the flexible conductor sheet except with a light-guide-plate side of the circumferential surface;
    a display panel positioned above the light-guide plate;
    an electrically-connecting conductor element having
        a first leaf spring pressed and sandwiched between said main face of the light-guide plate and the resin frame, as to be in surface-to-surface contact with the conductor sheet on said main face, and
        a second leaf spring contacting on an outer face of said one of side walls; and
    an electrically-conductive casing that holds the second leaf spring so as to be sandwiched between said one of sidewalls and the electrically-conductive casing.

5. A flat-panel display device according to claim 4, wherein said electrically-connecting conductor element is formed by blanking and folding of a metal plate and is substantially L-shaped in a cross section.

6. A flat-panel display device according to claim 4, wherein said frame is formed of a resin.

7. A flat-panel display device according to claim 4, wherein said conductor sheet is a laminated sheet formed of a conductor layer, in contact with said first leaf spring, and an insulator sheet.

8. A flat-panel display device according to any one of claims 4 and 5, wherein a difference between a thickness-wise dimension of said recess and a thickness-wise dimension of said first leaf spring ranges from 0.1 mm to 0.5 mm.

9. A flat-panel display device according to any one of claims 4 and 5, wherein said first leaf spring has a flat top portion between a distal portion and a leaf-base portion, to be in surface-to-surface contact with said conductor sheet.

10. A flat-panel display device according to claim 4, wherein said electrically-connecting conductor element has a base-plate-side section disposed on said base plate, and a sidewall-side section disposed on an outer face of said one of sidewalls, said base-plate-side section being comprised of said first leaf spring and a window frame that surrounds said first leaf spring and is continuous with an end of said first leaf spring.

11. A flat-panel display device according to claim 10, wherein said sidewall-side section is comprised of said second leaf spring and a window frame that surrounds said second leaf spring and is continuous with an end of said first leaf spring.

12. A flat-panel display device according to claim 11, wherein, in a cross sectional view, an outline of said window frame of the sidewall-side section runs along the outer face of said one of sidewalls.

13. A flat-panel display device according to claim 10, wherein an upper portion of the outer face of said one of sidewalls is inclined inward while an upper portion of said sidewall-side part is inclined inward to coincide with inclination of the upper portion of said outer face.

14. A flat-panel display device according to claim 1, wherein said first leaf spring has a flat top portion between a distal portion and a leaf-base portion, to be in surface-to-surface contact with said conductor sheet.

\* \* \* \* \*

UNITED STATES PATENT AND TRADEMARK OFFICE
CERTIFICATE OF CORRECTION

PATENT NO. : 6,490,016 B1
DATED : December 3, 2002
INVENTOR(S) : Koura

It is certified that error appears in the above-identified patent and that said Letters Patent is hereby corrected as shown below:

<u>Title page,</u>
Item [56], please add the following:
-- [56]   References Cited
     FOREIGN PATENT DOCUMENTS
     JP   5-324175   12/1993
     JP   10-96947   4/1998 --

Signed and Sealed this

Second Day of December, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,490,016 B1
DATED : December 3, 2002
INVENTOR(S) : Koura

It is certified that error appears in the above-identified patent and that said Letters Patent is hereby corrected as shown below:

<u>Title page,</u>
Please add the following:
-- [73] Assignee: Kabushiki Kaisha Toshiba, Kanagawa-ken (JP) --

Signed and Sealed this

Twentieth Day of April, 2004

JON W. DUDAS
*Acting Director of the United States Patent and Trademark Office*